United States Patent
Bleys

(10) Patent No.: US 6,245,825 B1
(45) Date of Patent: *Jun. 12, 2001

(54) POLYURETHANE FOAMS

(75) Inventor: Geert Bleys, Heverlee (BE)

(73) Assignee: Imperial Chemical Industries PLC, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/678,391

(22) Filed: Jul. 2, 1996

Related U.S. Application Data

(63) Continuation of application No. 08/333,940, filed on Nov. 3, 1994, now abandoned, which is a continuation of application No. 07/991,657, filed on Dec. 16, 1992, now abandoned.

(30) Foreign Application Priority Data

Dec. 17, 1991 (GB) .................................. 9126709
Dec. 17, 1991 (GB) .................................. 9126710

(51) Int. Cl.$^7$ .............................. C08J 9/08; C08G 18/10; C08G 18/48; C08G 18/77
(52) U.S. Cl. .................... 521/159; 521/137; 521/161; 521/174; 521/176; 521/914
(58) Field of Search ............................ 521/137, 159, 521/174, 176, 914, 161

(56) References Cited

U.S. PATENT DOCUMENTS

| | | | |
|---|---|---|---|
| 3,903,232 | 9/1975 | Wood et al. | 264/157 |
| 4,144,386 * | 3/1979 | Consoli et al. | 521/914 |
| 4,259,452 * | 3/1981 | Yukuta et al. | 521/914 |
| 4,289,856 * | 9/1981 | Yamamoto et al. | 521/174 |
| 4,303,755 * | 12/1981 | Yukuta et al. | 521/174 |
| 4,365,025 | 12/1982 | Murch et al. | 521/159 |
| 4,384,050 * | 5/1983 | Guthrie | 521/174 |
| 4,384,051 * | 5/1983 | Guthrie | 521/174 |
| 4,386,032 | 5/1983 | Hughes et al. | 560/27 |
| 4,980,072 | 12/1990 | Augustin et al. | 210/735 |
| 5,001,167 * | 3/1991 | Wiltz, Jr. et al. | 521/174 |
| 5,059,633 | 10/1991 | Lutter et al. | 521/160 |
| 5,063,253 | 11/1991 | Gansen et al. | 521/159 |
| 5,128,381 * | 7/1992 | Tane et al. | 521/174 |
| 5,237,036 * | 8/1993 | Spitzer | 521/914 |
| 5,418,261 * | 5/1995 | Helsemans et al. | 521/159 |
| 5,459,170 * | 10/1995 | Bleys et al. | 521/174 |
| 5,489,620 * | 2/1996 | Bleys | 521/174 |
| 5,565,498 * | 10/1996 | Chaffanjon et al. | 521/914 |
| 5,591,779 * | 1/1997 | Bleys et al. | 521/174 |
| 5,773,483 * | 6/1998 | Eling et al. | 521/125 |

FOREIGN PATENT DOCUMENTS

| | | |
|---|---|---|
| 3315596 | 10/1984 | (DE) . |
| 380993 | 8/1990 | (EP) . |
| 415127 | 8/1990 | (EP) . |
| 433878 | 6/1991 | (EP) . |

* cited by examiner

*Primary Examiner*—Rabon Sergent
(74) *Attorney, Agent, or Firm*—Pillsbury Madison & Sutro Intellectual Property Group

(57) ABSTRACT

Process for preparing a flexible foam by reacting a polyisocyanate having a high 4,4'-MDI content and a polyol having a high EO content in the presence of a foaming agent.

14 Claims, No Drawings

POLYURETHANE FOAMS

CROSS REFERENCE TO RELATED APPLICATIONS

The present application is a continuation of U.S. patent application Ser. No. 08/333,940 filed Nov. 3, 1994 entitled "Polyurethane Foams", now abandoned, which is a continuation of U.S. patent application Ser. No. 07/991,657 filed Dec. 16, 1992 also entitled "Polyurethane Foams", now abandoned.

The manufacture of polyurethane flexible foams by reacting organic polyisocyanates such as tolylene diisocyanate (TDI) or diphenylmethane diisocyanate (MDI) with polyether polyols in conjunction with a foaming agent is well established. The polyethers are usually polyoxypropylene polyols derived from propylene oxide or poly(oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates.

Polyols having higher oxyethylene contents, for example 50% or more on a weight basis, are often employed as minor additives to ensure that the foams have an open-cell structure. The use of these polyethers at very high concentrations in conjunction with the usual isocyanates is not possible because then, instead of having a cell-opening effect, they result in closed cell foam.

It has now been found that flexible foam having valuable properties can be successfully made from formulations containing high concentrations of polyols having high oxyethylene contents if substantially pure 4,4'-MDI or a derivative thereof is employed as the polyisocyanate.

Thus according to the invention, there is provided a method for the preparation of flexible polyurethane foams by reacting in the presence of a foaming agent a polyisocyanate containing at least 85%, preferably at least 90% and more preferably at least 95% by weight of 4,4'-diphenylmethane diisocyanate or a variant thereof with a polyol composition comprising at least one poly(oxyethylene-oxyalkylene) polyol having an average nominal hydroxyl functionality of from 2 to 6, an average hydroxyl equivalent weight of from 1000 to 3000 and an average oxyethylene content of from 50 to 85, preferably 60 to 85% by weight, preferably the oxyethylene content of any further optionally present polyol having an equivalent weight of 500 or more being at least 50% by weight.

The polyisocyanate component used in the method of the invention may consist essentially of pure 4,4'-diphenylmethane diisocyanate or mixtures of that diisocyanate with one or more other organic polyisocyanates, especially other diphenylmethane diisocyanate isomers, for example the 2,4'-isomer optionally in conjunction with the 2,2'-isomer. The polyisocyanate component may also be an MDI variant derived from a polyisocyanate composition containing at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanate composition and/or by reacting such a composition with one or more polyols.

The polyol composition may comprise a single polyoxyalkylene polyol, preferably a poly(oxyethylene-oxypropylene) polyol, having the required functionality, equivalent weight and oxyethylene content. Such polyols are known in the art and may be obtained in conventional manner by reacting ethylene and propylene oxides simultaneously and/or sequentially in any order with an initiator such as water, a polyol, a hydroxylamine, a polyamine and the like having from 2 to 6 active hydrogen atoms.

Alternatively, the polyol composition may comprise a mixture of two or more polyoxyalkylene polyols such that the total composition has the required average functionality, equivalent weight and oxyethylene content. The polyoxyalkylene polyols present in such mixtures are preferably poly(oxyethylene-oxypropylene) polyols but one or more polyoxyethylene polyols and/or polyoxypropylene polyols may also be present.

Preferred polyol compositions comprise:
  (a) from 85 to 100% by weight of a polyoxyalkylene polyol containing oxyethylene residues, said polyol component having an average nominal hydroxyl functionality of from 2 to 6, an average hydroxyl equivalent weight of from 1000 to 3000 and an average oxyethylene content of from 50 to 85% by weight, and
  (b) from 15 to 0% by weight of one or more other polyols.

Polyol (b) suitably has an average functionality of from 2 to 6, an average equivalent weight of 1000 to 3000 and may be, for example, a polyoxypropylene polyol, a polyoxyethylene polyol or a poly(oxyethylene-oxypropylene) polyol containing less than 50% or more than 85% by weight of oxyethylene residues.

Most preferably each polyol having an equivalent weight of 500 or more has an oxyethylene content of at least 50% by weight. The polyoxyalkylene polyols present in such mixtures are preferably poly(oxyethylene-oxypropylene) polyols but one or more polyoxyethylene polyols may also be present.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation. It is preferred that the average nominal hydroxyl functionality of the polyol composition is from 2 to 4, the most preferred polyoxyalkylene polyols being triols.

If desired, the polyoxyalkylene polyol (or one or more of the polyoxyalkylene polyols when a mixture of such is used) may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in the polyoxyalkylene polyol.

The preferred foaming agent for use in the method of the invention is water, optionally in conjunction with a physical blowing agent, for example a low boiling organo fluoro compound. The amount of foaming agent may be varied in known manner in order to achieve the desired foam density, suitable amounts of water being, for example, from 0.25 to 20% by weight based on the weight of polyol composition. Preferably water is the only foaming agent. The isocyanate index of the reaction system, taking account of the polyol composition, water and any other isocyanate-reactive species, for example chain extenders or cross-linking agents, may be as low as 10 or as high as 120.

The foam-forming reaction mixture may contain one or more of the additives conventional to such reaction mixtures. Such additives include catalysts, for example tertiary amines and tin compounds, surface-active agents and foam stabilisers, for example siloxane-oxyalkylene copolymers, chain extenders, for example low molecular weight diols or diamines, cross-linking agents, for example triethanolamine, flame retardants, organic and inorganic fillers, pigments, agents for suppressing the so-called boiling-foam effect like poly-dimethylsiloxanes and internal mould release agents.

Accordingly, in a further aspect, the invention provides a reaction system comprising:

(i) a polyisocyanate containing at least 85% by weight of 4,4'-diphenylmethane diisocyanate or a variant thereof;

(ii) a polyol composition comprising at least one polyoxyalkylene polyol containing oxyethylene residues, said polyol composition having an average nominal hydroxyl functionality of from 2 to 6, an average hydroxyl equivalent weight of from 1000 to 3000 and an average oxyethylene content of from 50 to 85% by weight, preferably the oxyethylene content of each polyol having an equivalent weight of 500 or more present in the polyol composition being at least 50% by weight;

(iii) a foaming agent comprising water, and, optionally, (iv) one or more additives conventional to foam formulations. This reaction system is used for making flexible foams. The term "reaction system" is defined as a system wherein the polyisocyanate is kept in a container separate from the isocyanate-reactive ingredients.

In operating the method of the invention, the known one-shot semi-prepolymer and full prepolymer techniques may be used together with conventional mixing equipment and the foams may be produced in the form of slabstock, mouldings and the like. Prepolymers having an NCO value of 5–30% by weight which are the reaction product of the above polyisocyanates (in excess) and polyols also form part of the invention. The preparation of such prepolymers is generally known in the art. Foams made by the method of the invention have valuable energy-absorbing properties making them useful for acoustic vibration damping as well as for seating purposes. The invention is illustrated but not limited by the following Examples in which all parts, percentages and ratios are by weight.

The following glossary of materials is included to identify reaction components not otherwise identified in the Examples.

Glossary

A2580 is Arcol 2580, a polyether triol having random oxyethylene and oxypropylene residues with a 77% oxyethylene content and a molecular weight of about 4000, commercially available from Arco. Arcol is a trade mark of Arco.

Dabco EG is a 33% solution of Dabco in ethylene glycol, obtainable from Air Products. Dabco is a trade mark of Air Products.

Dabco 33LV is a catalyst from Air Products.

D80/20 is an 20/80 mixture of Dabco and dimethylethanolamine.

Daltolac C4 polyol is a polyoxypropylene triol having a molecular weight of 170, commercially available from Imperial Chemical Industries PLC. Daltolac is a trademark of ICI PLC.

Suprasec VM021 polyisocyanate is a low functionality variant of 4,4'-MDI having an NCO content of 23%, commercially available from Imperial Chemical Industries PLC. Suprasec is a trademark of ICI PLC.

Suprasec VM022 polyisocyanate is a low functionality variant of 4,4'-MDI having an NCO content of 23%, commercially available from Imperial Chemical Industries PLC.

Suprasec MPR polyisocyanate is pure 4,4'-MDI, commercially available from Imperial Chemical Industries PLC.

Suprasec VM20 polyisocyanate is a uretonimine-modified 4,4'-MDI having an NCO content of 29.3%, commercially available from Imperial Chemical Industries PLC.

D8154 is Dabco 8154, a catalyst obtainable from Air Products.

DETDA is a mixture consisting of about 80% 3,5-diethyl-2,4-diaminotoluene and 20% 3,5-diethyl-2,6-diaminotoluene commercially available from Ethyl Corporation.

DBDTL is dibutyltin dilaurate.

DMDEE is bis(2-dimethylaminoethyl) ether.

DMEA is dimethylethanolamine.

A1 is Niax A1: a catalyst obtainable from Union Carbide.

EXAMPLE 1

Flexible foams were made by bench mixing the formulations given in Table 1 using a one-shot technique. Table 1 also gives the properties of the foams obtained.

TABLE 1

| Experiment | 1 | 2 | 3 | 4 | 5 | 6 | 7 | 8 |
|---|---|---|---|---|---|---|---|---|
| A2580 | 100 | 100 | 100 | 100 | 100 | 100 | 100 | — |
| PEG 1000 | — | — | — | — | — | — | — | 100 |
| water | 3 | 3 | 4 | 5 | 3 | 3 | 4 | 3 |
| Dabco EG | 0.6 | 0.2 | 0.1 | — | — | 0.4 | 0.1 | 0.4 |
| D80/20 | 0.2 | 0.9 | — | 0.13 | — | — | — | 0.2 |
| Daltolac C4 | — | 0.7 | 0.3 | — | — | — | — | — |
| DBTDL | — | — | 0.6 | 0.87 | 0.35 | 0.1 | 0.6 | — |

TABLE 1-continued

| Experiment | 1 | 2 | 3 | 4 | 5 | 6 | 7 | 8 |
|---|---|---|---|---|---|---|---|---|
| DMEA | — | — | — | — | 0.3 | — | — | — |
| A1 | — | — | — | — | — | 0.15 | — | — |
| Polyisocyanate (index) | VM21 (100) | VM22 (100) | MPR/VM20, 1:1 (100) | VM20 (100) | MPR/VM20, 1:1 (100) | MPR/VM20, 1:1 (100) | MPR/VM20, 1:1 (100) | VM20 (100) |
| end of rise time (sec) | 137 | 94 | 42 | 71 | 66 | 35 | 44 | — |
| free rise density (kg/m$^3$) | 39 | 39 | 32 | 26 | 35 | 36 | 31 | — |
| Compression load deflection, 40% (kPa) | 4.1 | 2.8 | 4.6 | 6.6 | 4.4 | 4.2 | 4.5 | — |
| Hysteresis loss, (%) | 26 | 24 | 29 | 39 | 21 | 20 | 28 | — |
| Resilience, (%) | 33 | 29 | 24 | 35 | 21 | 42 | 22 | — |
| Compression set, dry-50%, (%) | 3 | 4 | 4 | 11 | 6 | 6 | 5 | — |

*comparative example with polyethylene glycol having a molecular weight of 1000; no foam was obtained; the product obtained was "chewing-gum-like".

EXAMPLE 2

Flexible foams were made by machine mixing the formulations given in Table 2 using a one-shot technique. Table 1 also gives the properties of the foams obtained.

TABLE 2

| Experiment | 1 | 2 | 3 | 4 | 5 |
|---|---|---|---|---|---|
| A2580 | 100 | 100 | 100 | 100 | 100 |
| water | 4 | 4 | 4 | 4 | 5 |
| D8154 | — | 0.1 | 0.1 | 0.1 | — |
| DETDA | — | 0.4 | 0.4 | 0.4 | — |
| DBTDL | 0.15 | 0.1 | 0.1 | 0.1 | 0.6 |
| DMDEE | 0.35 | 0.3 | 0.3 | 0.3 | 0.13 |
| Isocyanate | VM20 | VM20 | VM20 | VM20 | VM20 |
| Index | 100 | 90 | 95 | 100 | 100 |
| End of rise (sec) | 67 | 68 | 70 | 60 | 38 |
| Free rise density (kg/m$^3$) | 37 | 33 | 32 | 34 | 23 |
| core density, (kg/m$^3$) | 36 | 34 | 34 | 39 | 25 |
| tear strength, (N/m) | 249 | 266 | 304 | 323 | 279 |
| resilience, (%) | 29 | 18 | 21 | 26 | 21 |
| compression load deflection 40%, (kpa) | 2.9 | 1.9 | 1.9 | 2.6 | 6.0 |
| hysteresis loss, (%) | 20 | 27 | 27 | 26 | 34 |
| compression set, dry 50%, (%) | — | 36 | 31 | 30 | 7 |

EXAMPLE 3

A prepolymer was prepared by reacting 60 parts by weight of A 2580 and 40 parts by weight of MPR. From this prepolymer a flexible foam was prepared by reacting it with a composition containing 2.47 pbw of water, 1.80 pbw of Daltolac C4 and 0.4 pbw of Dabco 33LV. The free rise density was 32 Kg/m$^3$; the compression load deflection (40%) was 2 kPa; the hysteresis loss was 7%; the resilience was 45% and no recession was observed.

In the above examples the densities, the tear strength, the resilience, the compression load deflection an the hysteresis loss were measured according to ISO 1855, ISO 8067, ISO 8307, ISO 3386 and ISO 3386 respectively.

I claim:

1. A method for the preparation of flexible polyurethane foams comprising reacting a polyisocyanate having at least 85% by weight of 4,4'-diphenylmethane diisocyanate with a polyoxyalkylene polyol (1) having an average hydroxyl equivalent weight of from 1000 to 3000, an average nominal hydroxyl functionality of from 2 to 6 and an average oxyethylene content of from 50% to 85% by weight with an optional polyol (2), wherein each polyol (2) that has an equivalent weight of 500 or more also has an oxyethylene content of at least 50% by weight, said polyol (1) is 85–100% by weight calculated on total weight of polyol (1) and an optional polyol (2), wherein the polyol (2) is 15 to 0% by weight calculated on total weight of the polyol (1) and polyol (2), and using water as a foaming agent in an amount of 0.25% to 20% by weight based on total weight of the polyol (1) and the polyol (2).

2. Method according to claim 1 wherein the polyol (1) has an average nominal hydroxyl functionality of from 3 to 6.

3. Method according to claim 1 wherein the polyol (1) is a poly(oxyethylene-oxypropylene) polyol having an average nominal hydroxyl functionality of 3.

4. Method according to claim 1 wherein the polyol (1) is a poly (oxyethylene-oxypropylene) polyol which has random oxyethylene and oxypropylene groups.

5. Method according to claim 1 wherein the polyisocyanate contains at least 95% by weight of 4,4'-diphenylmethane diisocyanate.

6. Method according to claim 1 wherein the polyol (1) is poly (oxyethylene-oxypropylene) polyol that has random oxyethylene and oxypropylene groups and an average nominal hydroxyl functionality of 3, wherein the polyol (1) is present in an amount of 100% by total weight of the polyol (1) and the optional polyol (2), and wherein 4,4'-diphenylmethane diisocyanate is at least 95% by weight of the polyisocyanate.

7. A method for preparation of flexible polyurethane foams comprising reacting a diphenylmethane diisocyanate variant derived from a polyisocyanate composition having 4,4'-diphenylmethane diisocyanate in an amount of at least 85% by weight of the polyisocyanate composition, said variant selected from the group consisting of liquid products obtained by introducing uretonimine, and/or carbodiimide groups into said polyisocyanate composition, products obtained by reacting said polyisocyanate composition with one or more polyols, or mixtures thereof, with a polyoxyalkylene polyol (1) having an average hydroxyl equivalent weight of from 1000 to 3000, an average nominal hydroxyl functionality of from 2 to 6 and an average oxyethylene content of from 50% to 85% by weight and optionally, a polyol (2), wherein the polyol (2) has an equivalent weight of 500 or more and also has an oxyethylene content of at least 50% by weight, wherein polyol (1) is 85–100% by weight calculated on total weight of polyol (1) and the polyol (2) and the polyol (2) is 15 to 0% by weight calculated on total weight of the polyol (1) and polyol (2), and using water as a foaming agent in an amount of 0.25% to 20% by weight based on total weight of the polyol (1) and polyol (2).

8. Method according to claim 7 wherein polyol (1) has an average nominal hydroxyl functionality of from 3 to 6.

9. Method according to claim 7 wherein polyol (1) is a poly(oxyethylene-oxypropylene) polyol having an average nominal hydroxyl functionality of 3.

10. Method according to claim 7 wherein polyol (1) is a poly(oxyethylene-oxypropylene) polyol which has random oxyethylene and oxypropylene groups.

11. Method according to claim 7 wherein the polyisocyanate composition contains at least 95% by weight of 4,4'-diphenylmethane diisocyanate.

12. Method according to claim 7 wherein polyol (1) is a poly (oxyethylene-oxypropylene) polyol that has random oxyethylene and oxypropylene groups and an average nominal hydroxyl functionality of 3 and which is present in an amount of 100% by weight calculated on total amount of polyol (1) and optional polyol (2), wherein the polyisocyanate composition contains at least 95% by weight of 4,4'-diphenylmethane diisocyanate.

13. Method according to claim 7 wherein the variant has an NCO content that is at least 23% by weight.

14. Method according to claim 12 wherein the variant has an NCO content that is at least 23% by weight.

* * * * *